UNITED STATES PATENT OFFICE.

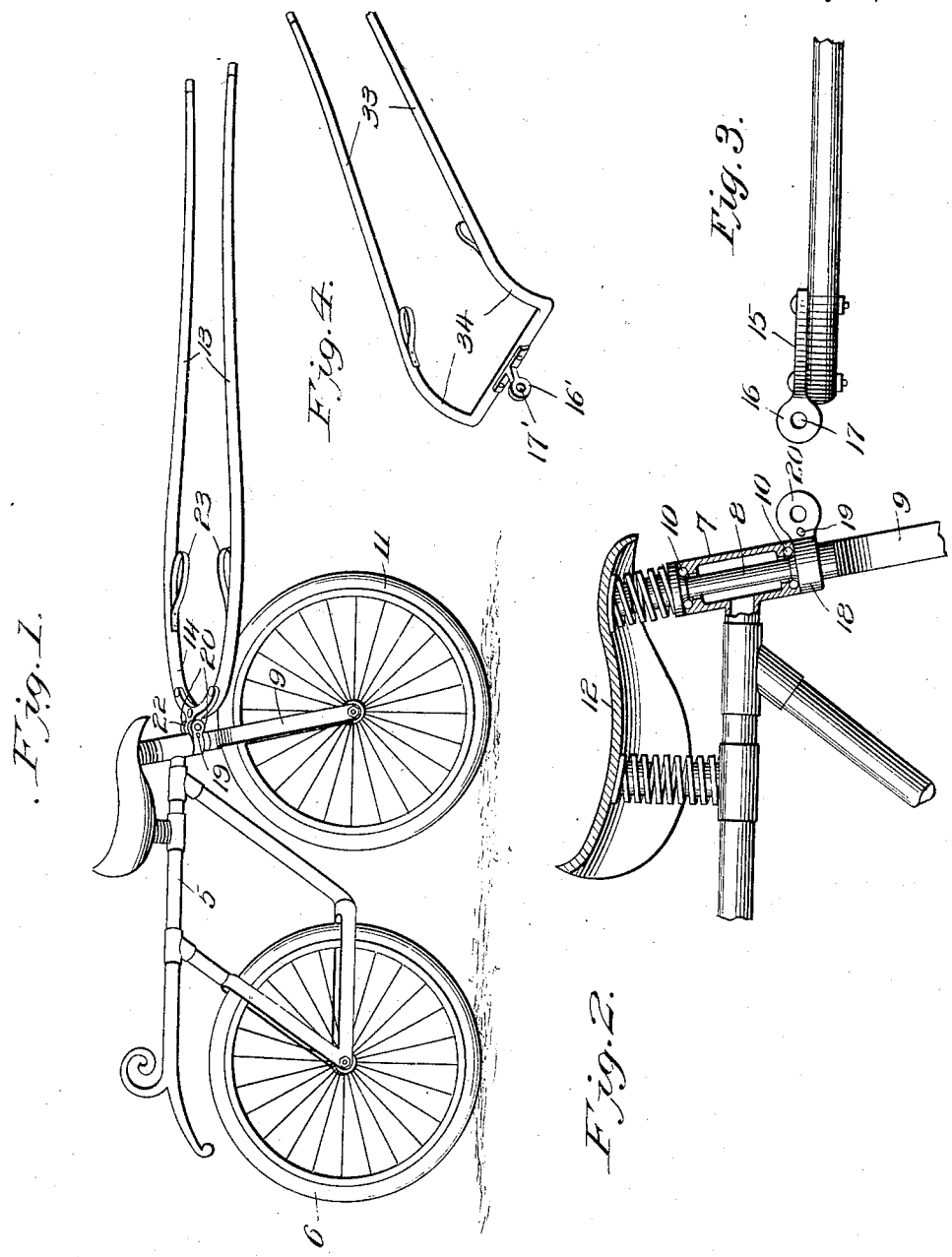

JAMES H. DICKSON, OF PHILADELPHIA, PENNSYLVANIA.

TROTTING-SULKY.

965,133.  Specification of Letters Patent. Patented July 19, 1910.

Application filed November 19, 1909. Serial No. 528,969.

*To all whom it may concern:*

Be it known that I, JAMES H. DICKSON, a citizen of the United States of America, residing at Philadelphia, in the county of Philadelphia and State of Pennsylvania, have invented new and useful Improvements in Trotting-Sulkies, of which the following is a specification.

This invention relates to trotting sulkies, and it has for its object to construct a simple and efficient sulky of the bicycle type in which the wheels are arranged tandem.

A further object of the invention is to construct a bicycle trotting sulky in which an ordinary bicycle pattern may be utilized with slight modifications and attachments.

Still further objects of the invention are to simplify and improve the general construction and operation of a device of the character described.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention; it being, however, understood that no limitation is necessarily made to the precise structural details therein exhibited, but that changes, alterations and modifications within the scope of the invention may be resorted to when desired.

In the drawing,—Figure 1 is a perspective view of a trotting sulky constructed in accordance with the invention. Fig. 2 is a sectional detail view taken through the front portion of the frame and the upper portion of the front fork. Fig. 3 is a side elevation, showing the rear portion of the thills detached. Fig. 4 is a perspective detail view showing a pair of thills of a slightly modified form.

Corresponding parts in the several figures are denoted by like characters of reference.

The bicycle portion of the improved trotting sulky comprises a frame 5 which may be of the ordinary diamond pattern, said frame being constructed to constitute a fork in which the rear wheel 6 is supported. The frame 5 carries the sleeve 7 wherein the neck 8 of the front fork or steering fork 9 is supported for oscillation, ball bearings 10 of suitable construction being preferably utilized to avoid undue friction. The front fork 9 supports the front wheel 11 which is utilized for steering purposes. The seat 12 is spring supported above the top bar of the frame, the seat having been shown as being partly supported above the sleeve 7.

The thills 13 have been shown as being formed by bending from a single piece of material, the connecting arch or cross bar 14 being reinforced by a brace 15 having a rearwardly extending lug 16 standing in a vertical plane and provided with a transverse aperture 17. A collar 18 which may be clamped upon the neck of the front fork by means of a bolt 19 is provided with terminal vertically disposed lugs 20 having transverse apertures 21 for the passage of a connecting bolt 22 which also extends through the aperture 17 of the lug 16 upon the thill brace 15, said bolt 22 serving to connect the thills with the neck of the steering fork. The thills are equipped with the customary stirrups or foot rests 23.

From the foregoing description, taken in connection with the drawing hereto annexed, the operation and advantages of the invention will be readily understood. The construction is extremely simple, as well as durable, and it is obvious that a sulky of this description requires but trifling power for its propulsion, being, therefore, especially fitted for the purposes of a trotting sulky. The thills will move freely in a vertical plane upon the connecting bolt 22 which serves as a hinge and will thus adapt themselves to the movement of the horse, while the front wheel carried by the steering fork will turn upon the axis of the latter and thus necessarily move in the direction in which the horse is guided.

It is desired to be understood that other means than those herein shown and described may be utilized for connecting the thrills with the front steering fork of the device and that other changes and modifications may be resorted to which will suggest themselves to a skilled mechanic.

Under the modified construction illustrated in Fig. 4 thills 33 have been shown having a curve or offset 34 near their rear ends, whereby the shafts will be located in a plane above the point of attachment afforded by the lug, here designated 16′, having the aperture 17', as is frequently desirable.

Having thus described the invention, what is claimed as new, is:—

5. A bicycle having a steering fork, a clip engaging said fork and having terminal apertured lugs, a pair of thills having a brace member provided with an apertured lug, and a hinge bolt extending through the several apertured lugs and forming a hinge connection therebetween.

In testimony whereof I affix my signature in presence of two witnesses.

JAMES H. DICKSON.

Witnesses:
   Chas. H. White,
   Wm. J. O'Brien.